(12) United States Patent
Kawamura et al.

(10) Patent No.: US 8,545,105 B2
(45) Date of Patent: Oct. 1, 2013

(54) ROLLING BEARING AND CROWN-SHAPED RETAINER

(75) Inventors: Mitsuo Kawamura, Kuwana (JP); Hiroki Fujiwara, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/637,578

(22) PCT Filed: Mar. 24, 2011

(86) PCT No.: PCT/JP2011/057126
§ 371 (c)(1),
(2), (4) Date: Sep. 26, 2012

(87) PCT Pub. No.: WO2011/122429
PCT Pub. Date: Oct. 6, 2011

(65) Prior Publication Data
US 2013/0022304 A1 Jan. 24, 2013

(30) Foreign Application Priority Data

Mar. 29, 2010 (JP) .................. 2010-074326
Jan. 14, 2011 (JP) .................. 2011-005762

(51) Int. Cl.
*F16C 19/00* (2006.01)
*F16C 33/38* (2006.01)
*F16C 33/41* (2006.01)

(52) U.S. Cl.
USPC ........... 384/470; 384/523; 384/531; 384/533; 384/534

(58) Field of Classification Search
USPC .................. 384/523, 531–534, 462, 470
See application file for complete search history.

(56) References Cited

U.S. PATENT DOCUMENTS

| 6,276,836 B1 | 8/2001 | Suzuki et al. |
| 6,533,462 B2 | 3/2003 | Kawakami |
| 6,723,684 B2 | 4/2004 | Akiyama et al. |

(Continued)

FOREIGN PATENT DOCUMENTS

| DE | 102008059571 | * | 6/2010 |
| JP | 07-217659 | | 8/1995 |

(Continued)

OTHER PUBLICATIONS

English Translation of the International Preliminary Report on Patentability mailed Nov. 1, 2012 in corresponding International Patent Application No. PCT/JP2011/057126.

(Continued)

*Primary Examiner* — Phillip A Johnson

(57) ABSTRACT

A rolling bearing assembly and a crown shaped retainer, in which the rotating torque of the bearing assembly can be reduced with no limitation in use of the bearing assembly and with no need to modify the grease and the sealing member are provided. The rolling bearing assembly includes a plurality of balls interposed between inner and outer rings, and a retainer for retaining the balls. The retainer is of a crown shaped configuration including a retainer ring body having one side face formed with pockets, each having a portion with an opening, defined at respective locations in a circumferential direction for accommodating therein the balls; a grease reservoir depressed portion provided between the neighboring pockets in the circumferential direction of the retainer ring body for reserving a grease; and a communicating port for communicating the grease reservoir depressed portion and the pocket.

14 Claims, 10 Drawing Sheets

(56) References Cited

U.S. PATENT DOCUMENTS

| | | |
|---|---|---|
| 2002/0041719 A1 | 4/2002 | Kawakami |
| 2002/0061961 A1 | 5/2002 | Yabe et al. |
| 2003/0148896 A1 | 8/2003 | Akiyama et al. |
| 2011/0135234 A1* | 6/2011 | Hosmer ........................ 384/523 |

FOREIGN PATENT DOCUMENTS

| | | | |
|---|---|---|---|
| JP | 10213139 A | * | 8/1998 |
| JP | 10220480 A | * | 8/1998 |
| JP | 10-238543 | | 9/1998 |
| JP | 2002-98151 | | 4/2002 |
| JP | 2002-302571 | | 10/2002 |
| JP | 3875108 | | 11/2006 |
| JP | 2007315587 A | * | 12/2007 |
| JP | 2008-261484 | | 10/2008 |
| JP | 2009-19766 | | 1/2009 |
| JP | 2009024822 A | * | 2/2009 |

OTHER PUBLICATIONS

International Search Report of PCT/JP2011/057126 mailed Jun. 28, 2011.

* cited by examiner

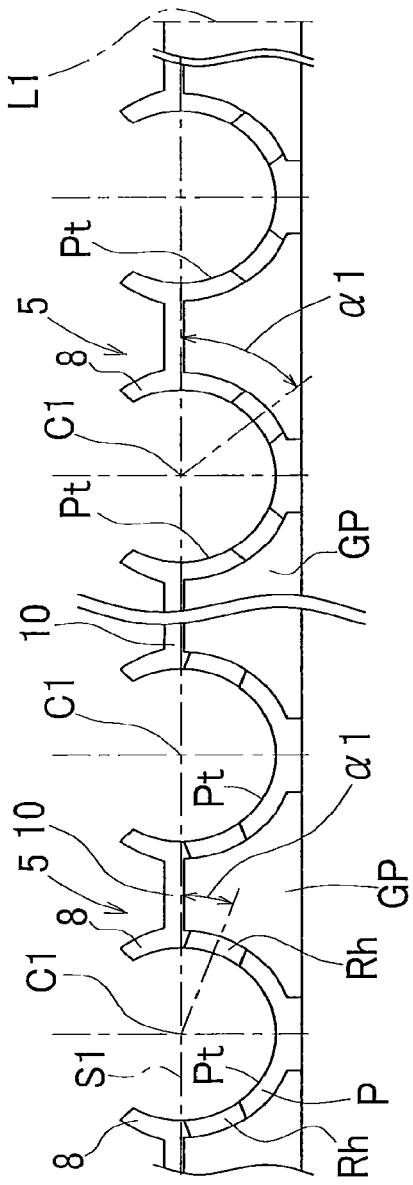
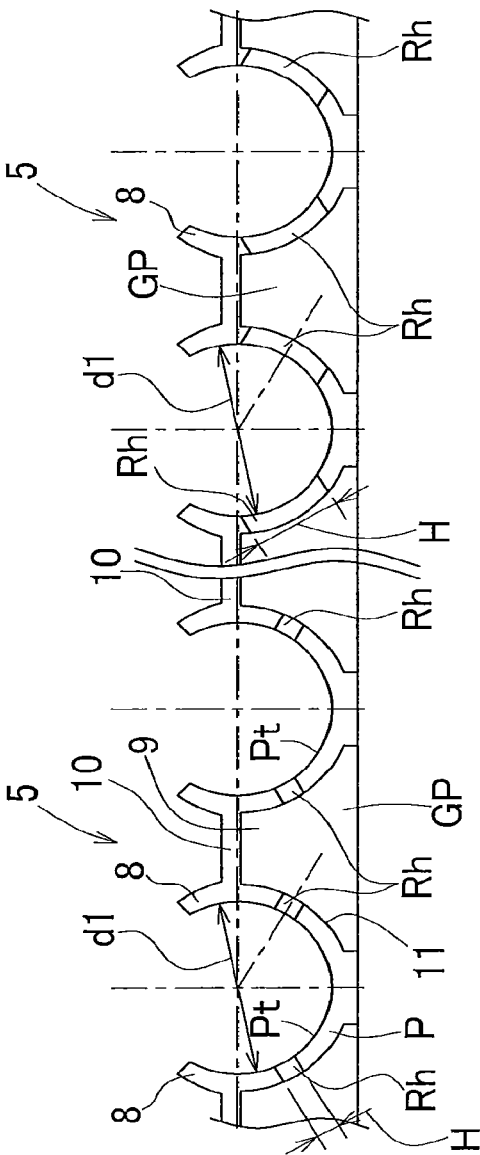
Fig. 5
Fig. 6

ROLLING BEARING AND CROWN-SHAPED RETAINER

CROSS REFERENCE TO THE RELATED APPLICATION

This application is a U.S. National Stage application of PCT/JP2011/057126 filed Mar. 24, 2011 and claims foreign priority to Japanese patent application No. 2010-074326, filed Mar. 29, 2010, and Japanese patent application No. 2011-005762, filed Jan. 14, 2011, the entire disclosures of both of which are herein incorporated by reference as a part of this application.

BACKGROUND OF THE INVENTION

1. Field of the Invention

The present invention relates to a bearing assembly and a crown-shaped retainer for use in a rolling bearing assembly and, more particularly, to the structure of a retainer capable of providing a low torque.

2. Description of Related Art

Most of ball bearing assemblies currently available are used in a condition with a grease filled therein as a lubricating agent and sealed by a seal or a shield. The bearing assembly utilizing the grease has some advantages in that as compared with the lubrication with oil, no oil supply system is needed, and is hence maintenance free. In the bearing assembly, not only does a rotating torque, that is, a resistance to rotation occur, but also influences brought about by the friction present between rolling elements and a retainer and agitation and viscosity of a lubricating agent tend to affect the operability of the bearing assembly. Where the lubrication with a grease takes place in the bearing assembly, an agitating resistance, with which balls and/or a retainer agitate the grease, and an shearing resistance, with which the grease is sheared between the retainer and sealing members, form a torque of the bearing assembly.

In the bearing assembly of a kind that is lubricated with a grease, as a related art technique designed to lower the rotating torque, the disclosure has been made that depending on the composition of the grease used to lubricate, the rotating torque of the bearing assembly tends to be lowered even at a low temperature (such as disclosed in, for example, the patent document 1 listed below). Also, as another related art technique designed to achieve a low torque in the bearing assembly, the disclosure has been made that a minimum required amount of a lubricating agent is seized in between inner peripheral faces of retainer pockets and rolling surfaces of the rolling elements to thereby reduce retainer noses and the rotating torque (such as disclosed in, for example, the patent document 2 listed below). As a further related art technique designed to achieve a low torque with a retainer, the disclosure has been made that when rolling elements collide against pockets, a groove having a cushioning function is provided between the neighboring retainer pockets (such as disclosed in, for example, the patent document 3 listed below).

As a yet other related art technique designed to achieve a low torque in the bearing assembly, the disclosure has been made that the composition of a bearing sealing portion and the shape are modified (such as disclosed in, for example, the patent document 4 listed below).

PRIOR ART DOCUMENT

Patent Document

[Patent Document 1] Japanese Patent No. 3875108
[Patent Document 2] JP Laid-open Patent Publication No. H10-238543
[Patent Document 3] JP Laid-open Patent Publication No. 2009-19766
[Patent Document 4] Japanese Patent No. 3772688

SUMMARY OF THE INVENTION

Since depending on the application of the bearing assembly, the grease and/or the sealing member cannot be modified, application of the torque reducing method that is practiced with the grease or the sealing member is limited. In the retainer of the type, in which the minimum required amount of the lubricating agent is seized in between the inner peripheral faces of the retainer pockets and the rolling surfaces of the balls as discussed above, no effect of reducing the torque is obtained. In the other retainers discussed above, since the surface area required to retain the rolling elements decreases, there is the possibility that rocking and rattling may occur. In the case of the retainer of the type, in which the groove having the cushioning function is provided between the neighboring retainer pockets as discussed above, although the torque reduction can be expected at the time of start-up and occurrence of an misalignment, the torque that makes no difference from that occurring in the conventional retainer will occur.

An object of the present invention is to provide a rolling bearing assembly and a crown shaped retainer, in which the rotating torque of the bearing assembly can be assuredly reduced with no limitation in use of the bearing assembly and also with no need to modify, or alter in any way whatsoever, the grease and the sealing member.

The rolling bearing assembly designed in accordance with one aspect of the present invention is a rolling bearing assembly including a plurality of balls interposed between inner and outer rings; and a retainer for retaining the balls, in which the retainer is of a crown shaped configuration including a retainer ring body having one side face formed with a plurality of pockets, each having a portion with an opening, defined at respective locations in a circumferential direction for accommodating therein the balls; a grease reservoir depressed portion provided between the pockets neighboring with each other in the circumferential direction of the retainer ring body for reserving a grease; and a communicating port provided to communicate the grease reservoir depressed portion and the pocket for allowing the grease deposited on the balls to migrate into the grease reservoir depressed portion as a result of relative movement between the balls and the retainer.

According to the above described construction, since the use is made of the grease reservoir depressed portion in the retainer and of the communicating port for communicating between the pockets for receiving therein the corresponding balls, the grease deposited on the balls can be migrated into the grease reservoir depressed portions through the communicating port during the operation of the bearing assembly. In other words, as the balls roll within the respective pockets, a portion of the grease deposited on each of the balls reaches the communicating port and the further rolling of the balls within the pockets allows that portion of the grease to be, for example, scraped off from the balls by an edge of the communicating port or urged to move towards the side of the grease reservoir depressed portion through the communicating port by the effect of a pressure or the like of the ball. Since the grease referred to above is accommodated within the grease reservoir depressed portion and rotates together with the retainer, the stirring resistance and the shearing resistance, both referred to hereinabove, can be reduced. In the lubrication with the grease, a base oil of the grease acts in lubrication. The base oil separated from the grease reserved within the grease reservoir depressed portion is supplied to the balls through the communicating port and, therefore, the base oil required for the lubrication can be utilized.

In one embodiment of the present invention, the communicating port may be in the form of a cutout open radially of the retainer ring body and having a configuration effective to communicate between the grease reservoir depressed portion and the pocket. In such case, an effect of scraping the grease with an edge of the cutout is enhanced to facilitate the migration of the grease into the grease reservoir depressed portion. Also, without making the retainer complicated in shape, it is possible to provide the communicating port in the retainer ring body.

In one embodiment of the present invention, the angle of a center portion of the communicating port relative to the plane perpendicular to an axis of the retainer ring body and passing through a center of the pocket may be so chosen as to fall within the range of 20 to 50 degrees. Where the retainer is to be manufactured by the use of any known injection molding technique, if the angle of the center portion of the communicating port relative to the above described plane is smaller than 20 degrees, it will become difficult to remove the retainer from a mold assembly. Also, since areas of contact between the balls and the inner and outer rings, that is, the raceways carry a small amount of the grease deposited therein, an effect of scraping the grease into the grease reservoir depressed portion will be low if the angle referred to above is too small. By selecting the above described angle to be within the range of 20 to 50 degrees, the manufacture becomes easy and an effect of scraping the grease into the grease reservoir depressed portion is enhanced and, therefore, the torque reduction can be achieved.

In one embodiment of the present invention, the maximum widthwise dimension of the communicating port as measured along a retainer circumferential direction of the pocket may be so chosen as to be within the range of 10 to 40% of the inner diameter of the pocket. If the size of the communicating port is smaller than the lower limit of 10% of the inner diameter of the pocket, it will become difficult to transfer the grease through the communicating port. On the other hand, if the size of the communicating port is larger than the upper limit of 40% of the inner diameter of the pocket, it will become difficult for the pocket to retain the ball.

In one embodiment of the present invention, the grease reservoir depressed portion, when viewed in a plane containing an axis of the retainer ring body and passing a middle point between the neighboring pockets, may have such a shape as to be defined by an inner wall face of the retainer ring body and a connecting segment bridging between the neighboring pockets; and the grease reservoir depressed portion may then have one or both of an inclined face of the inner wall face inclined relative to the axis and an inclined face of the connecting segment inclined relative to a plane perpendicular to the axis.

Where the inner wall face has an inclined face inclined relative to the axis referred to above, in the case of the inclined face of a type in which the wall thickness of the inner wall face gradually decreases in a direction towards the counter pocket side, during the operation of the bearing assembly it is possible to smoothly discharge the grease, reserved within the grease reservoir depressed portion, from the inclined face to the bearing space by the effect of a centrifugal force developed as a result of rotation. Conversely in the case of the inclined face of a type in which the wall thickness of the inner wall face gradually increases in a direction towards the counter pocket side, during the operation of the bearing assembly it is impossible to detain the grease, reserved within the grease reservoir depressed portion, without being leaked.

Where the inner wall face has an inclined face inclined relative to the axis referred to above, in the case of the inclined face of a type in which the wall thickness of the connecting segment gradually decreases in a direction radially inwardly, the retainer rigidity is increased and the strength of the retainer can be secured when it is operated at a high speed. Also, during the operation of the bearing assembly, it is possible to allow the grease, reserved within the grease reservoir depressed portion, to be smoothly discharged from the inclined face into the bearing space through the inner wall face by the effect of the centrifugal force developed as a result of the rotation. If conversely the wall thickness of the connecting segment gradually increases in a direction radially inwardly, the grease reserved within the grease reservoir depressed portion can be retained without being leaked.

In one embodiment of the present invention, a partition wall may be provided within the grease reservoir depressed portion. The presence of the partition wall makes it possible to facilitate the retention of the grease within the grease reservoir depressed portion. Of the retainer ring body, a second side face of the grease reservoir depressed portion on a counter pocket side may be provided with a cover member for covering such second side face. In the case of the high speed rotation, the grease reserved within the grease reservoir depressed portion can be retained without being leaked.

In one embodiment of the present invention, a first recess portion may be provided in a pocket open edge in an inner face of the pocket on a ring body outer diametric side. The provision of the first recess portion makes it possible to facilitate the migration towards an inner ring side without being scraped by a retainer outer diametric edge. For this reason, during the rolling of the balls retained by the retainer, the amount of the grease reserved on an outer ring side within the bearing assembly is reduced and the grease can be rather much drawn into the grease reservoir depressed portion.

In one embodiment of the present invention, a second recess portion may be provided at a bottom of an inner face of the pocket. In this case, since a portion of the base oil separated from the grease enters into the second recess portion, the viscous shearing resistance resulting from the base oil between the ball and the pocket can be reduced. Therefore, it is possible to further contribute to the reduction of the torque.

In one embodiment of the present invention, the retainer may be formed by means of an injection molding technique, in which case the communicating port is so shaped as to extend to parallel to an axis of the retainer ring body or flared outwardly from a pocket side towards the grease reservoir depressed portion. In this case, the retainer can be easily removed from a mold assembly used in the practice of the injection molding. Also, a mold on the grease reservoir depressed portion side, where a processing is relatively easy to achieve, not on the pocket side where a highly precise processing is required in the mold assembly, can be adopted as a mold for forming the respective communicating port. Accordingly, the cost required to assemble the mold assembly can be reduced.

In one embodiment of the present invention, the retainer may contain a synthetic resinous material or a resinous material of plant origin. Where the retainer is to be manufactured by the use of the injection molding technique excellent for its capability of accomplishing a mass production, the use of a polyamide resin such as, for example, nylon as the synthetic resinous material makes it easy to process and assemble and does therefore make it possible to manufacture at a low cost.

Also, the use of polyether ether ketone, PEEK for abbreviation, as the synthetic resinous material for the retainer makes it possible to render it to be excellent in high strength, heat resistance, wear resistance and resistance to hydrolysis. On the other hand, the use of polyphenylene sulfide, PPS for abbreviation, as the synthetic resinous material for the retainer makes it possible to provide a retainer excellent in high temperature characteristic and resistance to chemicals and having a high incombustibility and a high dimensional stability. Considering the low environmental loading currently strongly required in industrial products, resinous materials of plant origin are used as the material for the retainer. That is, bioplastics of a kind effective to achieve the zero $CO_2$ balance (carbon neutral) are used and this category includes, for example, polylactic acid or polybutylene succinate, which are synthesized from carbohydrates such as, for example, sugar cane or corn, and polyamides which are synthesized from, for example, castor oil.

In one embodiment of the present invention, the grease may be initially filled in the grease reservoir depressed portion. The term "initially" referred hereinabove and hereinafter is to be construed as meaning a grease filling stage during the assemblage of the bearing assembly. Although when the grease quickly migrates into the grease reservoir depressed portion in an extremely brief time, a low torque is attained, if the grease is initially filled in the grease reservoir depressed portions without modifying or otherwise altering the grease filling amount of the grease filled within the bearing space, only the grease present in the raceways out of the entire quantity of the grease filled within the bearing space contributes to the lubrication during the start-up time. Since the grease reserved within the grease reservoir depressed portion rotates together with the retainer, it is possible to reduce the stirring resistance, with which the balls and the retainer agitate the grease, and the shearing resistance with which the grease is sheared. Accordingly, the torque at the time of start-up can be reduced. Thereafter, a portion of the base oil separates from the grease filled in the grease reservoir depressed portions and is supplied to the balls within the pockets through the communicating port for the lubrication thereof. In this way, not only is that portion of the base oil required for the lubrication utilized, the thickening agent used in the grease is left within the grease reservoir depressed portions GP, and, therefore, neither the stirring resistance nor the shearing resistance will increase during the operation of the bearing assembly. The rolling bearing assembly referred to above may be either a deep groove ball bearing or an angular contact ball bearing. A sealing member for sealing the bearing space, delimited between the inner and outer rings, in the rolling bearing assembly referred to above may be employed.

In one embodiment of the present invention, the communicating port may communicate the grease reservoir depressed portion and the pocket on one side of a circumferential direction relative to the grease reservoir depressed portion with each other. During the operation of the bearing assembly, at the communicating port in the retainer, an excessive grease deposited on the ball is scraped from a bearing inner diametric side in the bearing space. For this reason, in the case of the application in which the direction of rotation of either one of the inner and outer rings is fixed, if the communicating port is provided which communicates between the grease reservoir depressed portion and the adjacent pocket on such one side of the circumferential direction, during the operation of the bearing assembly, such a functional effect occurs in that the grease deposited on the balls as a result of the relative movement of the balls in one direction relative to the retainer is smoothly migrated into the corresponding grease reservoir depressed portion through the communicating port. Accordingly, the torque reduction can be achieved.

The present invention also provides a crown shaped retainer including a pocket partially open at one side of the retainer ring body for retaining the corresponding ball, the pocket being defined at a plurality of circumferential locations of the retainer ring body, a grease reservoir depressed portion provided in between the circumferentially spaced and neighboring pockets in the retainer ring body, and a communicating port defined in the retainer ring body for communicating the grease reservoir depressed portion with the pockets, the communicating port being operable to scrape the grease, deposited on the corresponding ball off therefrom for transfer to the grease reservoir depressed portion by the effect of a relative movement between the balls and the retainer.

According to the construction described above the grease deposited on the ball during the operation of the bearing assembly is migrated into the grease reservoir depressed portion by the communicating port. Since the grease is accommodated within the grease reservoir depressed portion and rotates together with the retainer, the stirring resistance and the shearing resistance, both discussed hereinabove, can be reduced. In the practice of the lubrication with the grease, the base oil of the grease works in lubrication. The base oil separated from the grease reserved within the grease reservoir depressed portion is supplied to the ball through the communicating port, the base oil required for the lubrication can be utilized.

In this crown shaped retainer, the communicating port may be in the form of a cutout opening radially inwardly of the retainer ring body and communicating between the grease reservoir depressed portion and the pocket with each other. In this case, an effect of scraping the grease with the edge of the cutout can be increased.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 5 is a fragmentary sectional view showing examples A and B of different retainers having a cutout defined at different positions, in a developed form as cut along the cylindrical surface containing the pitch circle;

FIG. 6 is a fragmentary sectional view showing examples A and B of the different retainer having a cutout of different sizes, in a developed form as cut along the cylindrical surface containing the pitch circle;

DESCRIPTION OF THE EMBODIMENTS

Figure 1:
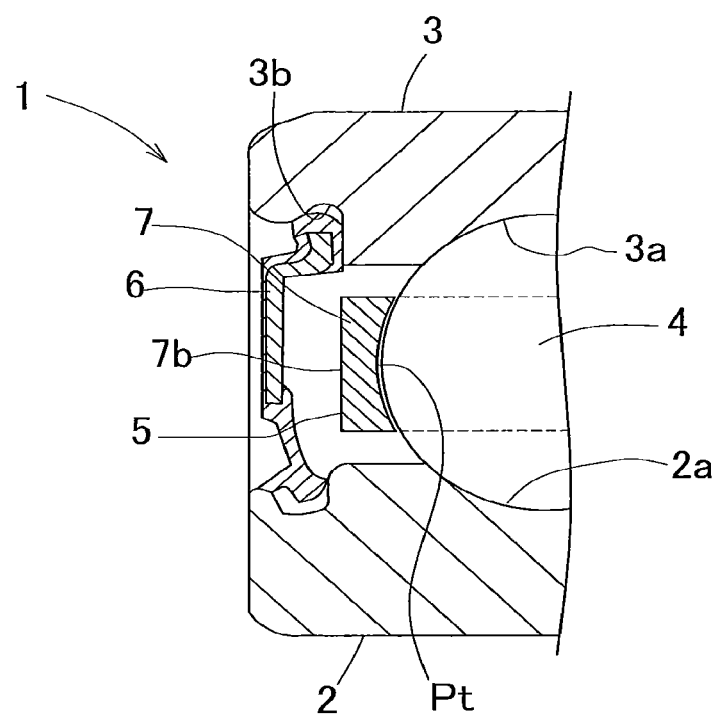
FIG. 1 is a longitudinal sectional view showing a portion of a rolling bearing assembly designed according to a first embodiment of the present invention.

A first embodiment of the present invention will be described in detail with particular reference to FIG. 1 to FIGS. 9A and 9B. As best shown in FIG. 1, a rolling bearing assembly 1 according to the first embodiment is a deep groove ball bearing of a sealed type and is made up of an inner ring 2, an outer ring 3, a plurality of balls 4, a retainer 5 and a pair of sealing members 6 and 6 used to seal opposite open ends of an annular bearing space delimited between the inner ring 2 and the outer ring 3. The outer ring 3 has opposite sealing grooves 3a defined therein and the sealing members 6 are respectively engaged in those sealing grooves 3a. It is to be noted that in the deep groove ball bearing, one or even both of the opposite sealing members 6 may be dispensed with. Although in FIG. 1 each of the sealing members 6 is shown as employed in the form of a contact sealing member, it may be in the form of a non-contact sealing member. It is also to be noted that for each of the sealing members 6, a shield in the form of a metallic plate may be employed. The outer ring 3 has an inner periphery having a raceway 3a defined therein, and the inner ring 2 has a raceway 2a defined therein in face to face relation to the raceway 3a. The plurality of the balls 4 referred to above are interposed between the inner and outer rings 2 and 3 having been received rollingly in part within the raceway 2a and in part within the raceway 3a, with those balls 4 operatively retained by the retainer 5. A grease is filled in the annular bearing space. Each of the balls 4 is employed in the form of, for example, a steel ball.

Figure 2A:
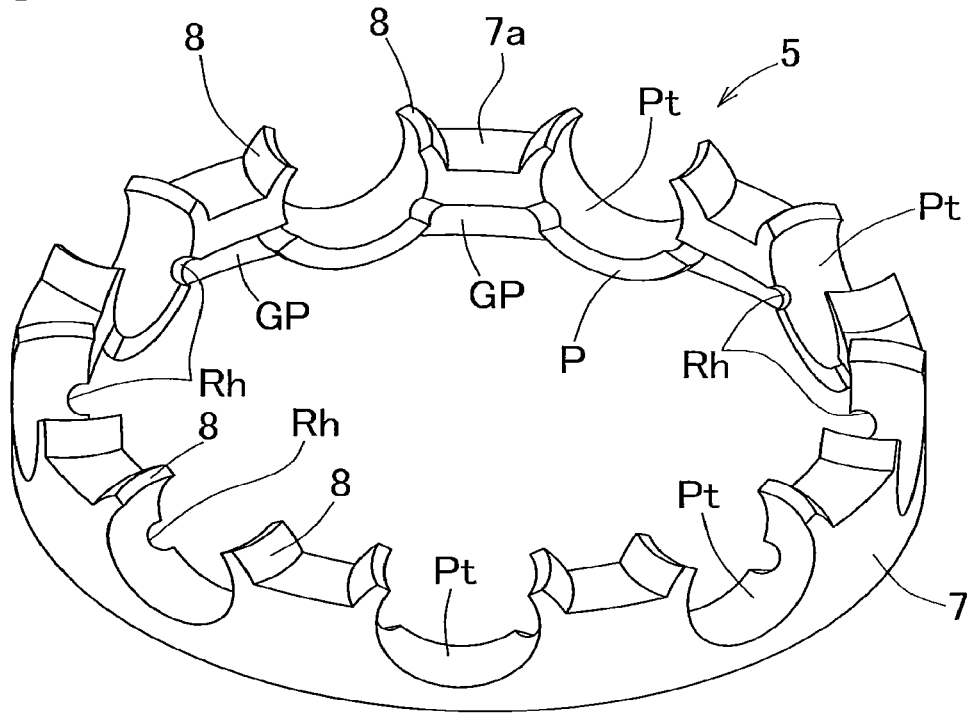
FIG. 2A is a perspective view showing a retainer for the rolling bearing assembly as viewed from a pocket side thereof.
Figure 2B:
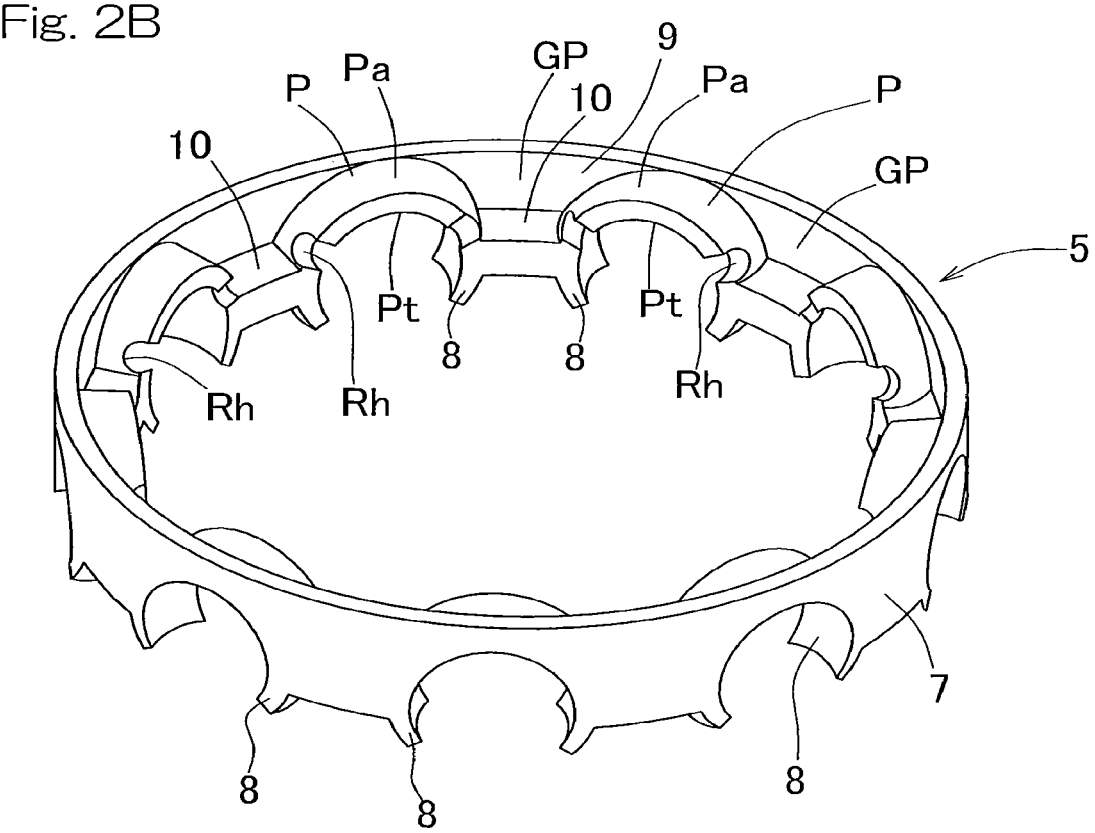
FIG. 2B is a perspective view showing the retainer for the rolling bearing assembly as viewed from a counter pocket side thereof.

The details of the retainer 5 will now be described. Referring to FIGS. 2A and 2B, the retainer 5 is of a crown shaped configuration including a retainer ring body 7 having one side face 7a formed with a plurality of pockets Pt, each having a portion with an opening, defined at respective locations in a circumferential direction for accommodating therein the balls 4. The illustrated retainer 5 is formed by means of an injection molding or machine working of, for example, a synthetic resinous material. For the synthetic resinous material, a polyamide resin such as, for example, nylon, polyether ether ketone, PEEK for abbreviation, or polyphenylene sulfide, PPS for abbreviation, for example, may be employed. The retainer 5 is of a design, in which inner faces of those pockets Pt are represented by respective spherical faces of the same curvature and, with the balls 4 snapped into the corresponding pockets Pt, a rolling element guide format is constructed, in which constraint is made in axial, radial and circumferential directions.

A pair of pawls 8 and 8, employed for each of the pockets Pt in the retainer ring body 7, protrude outwardly in an axial direction from opposite ends of the respective pocket Pt in a circumferential direction, which ends lie in an side face on an open side of the pockets Pt in the retainer ring body 7. Those pawls 8 and 8 of each pair are opposed to each other in the circumferential direction of the retainer ring body 7 and cooperate with each other to define a portion of the corresponding pocket Pt. In other words, respective inner faces of the pawls 8 and 8 of each pair are formed so as to be held respective positions of the same center of curvature as those of corresponding spherical faces forming corresponding pocket bottom faces and occupy respective portions of the spherical faces of the same radius of curvature. The remaining portion of each of the pockets Pt is defined, as best shown in FIG. 2B, by an inner peripheral face of a corresponding pocket wall P so formed as to protrude radially inwardly from an inner peripheral face of the retainer ring body 7.

Figure 3:
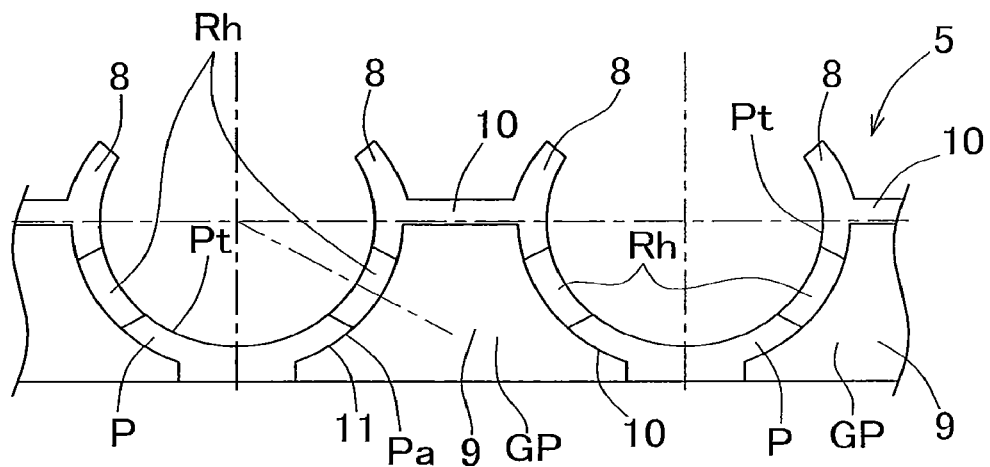
FIG. 3 is a fragmentary sectional view showing a portion of the retainer in a developed form as cut along a cylindrical surface containing the pitch circle.
Figure 4:
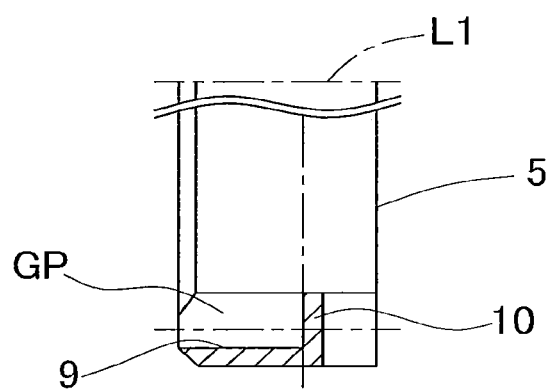
FIG. 4 is a fragmentary sectional view of a portion of a retainer ring body of the retainer, which is cut along a plane containing an axis of the retainer ring body, to show a corresponding grease reservoir depressed portion defined in the retainer ring body of the retainer.

As best shown in FIG. 3, the retainer ring body 7 is formed with a grease reservoir depressed portion GP as a grease pocket for reserving a grease therein, between the neighboring pockets Pt and Pt, which adjoin to each other in the circumferential direction. As shown in FIG. 2B, a counter pocket side of the retainer ring body 7 remote from the corresponding grease reservoir depressed portion GP (an axially upper side as viewed in FIG. 2B) is opened. Each of the grease reservoir depressed portions GP is delimited by an inner wall face 9 in the retainer ring body 7, an outer wall face Pa which is an outer peripheral face of the partially spherical pocket wall P of the neighboring pockets Pt and Pt, and a connecting segment 10 and is so formed as to enable the grease to be accommodated therein. As shown in FIG. 4, each of the grease reservoir depressed portions GP, when viewed in a plane containing an axis L1 of the retainer ring body 7 and passing a middle point between the neighboring pockets Pt and Pt, has such a shape as to be defined by the inner wall face 9 of the retainer ring body 7 and the connecting segment 10 bridging between the neighboring pockets Pt and Pt.

As best shown in FIG. 3, the retainer ring body 7 is formed with a plurality of communicating ports Rh each communicating between the corresponding grease reservoir depressed portion GP and the adjacent pocket Pt. Each of those communicating ports Rh has a function of supplying a base oil of the grease, pooled within the grease reservoir depressed portions GP, towards each of the balls 4 (shown in FIG. 1), that are accommodated within the respective pockets Pt. Also, during the operation of the bearing assembly, the grease depositing on each of the balls 4 is allowed to migrate towards the grease reservoir depressed portion GP through the adjacent communicating port Rh by the effect of the movement of the balls 4 relative to the retainer 5.

As shown in FIGS. 2A and 2B, each of the communicating ports Rh is in the form of a cutout that communicate between the grease reservoir depressed portion GP and the pocket Pt and opens radially inwardly of the retainer ring body 7. On this occasion, as shown in FIG. 5 which illustrates examples A and B, the plane S1 orthogonal to the axis L1 of the retainer ring body 7 and passing through the geometric center C1 of the respective pocket Pt is used as a base level. An angle α1 of a center portion of each of the communicating ports Rh relative to the plane S1 referred to above is so chosen as to be preferably within the range of 20 to 50 degrees. Where the retainer 5 is manufactured by the use of an injection molding technique, separation of the retainer from a mold assembly used in the practice of the injection molding will be difficult to achieve if the angle α1 of the center portion of each of the communicating ports Rh relative to the plane S1 referred to above is not greater than 20 degrees. Also, the amount of the grease deposited on a contact area between the balls 4 and each of the inner and outer rings 2 and 3, that is, the raceways 2a and 3a is so small that if the angle α1 is small, an effect of scraping the grease to migrate into the grease reservoir depressed portions GP will be small. Accordingly, where the angle α1 referred to above is so chosen as to be within the range of 20 to 50 degrees, not only can the manufacturing be facilitated, but the effect of scraping the grease into the grease reservoir depressed portions GP can also be enhanced, thus making it possible to reduce the torque.

Referring now to FIG. 6 which illustrates examples A and B, the size of each of the communicating ports Rh, that is, the maximum widthwise dimension H as measured in a direction circumferentially of each of the pockets Pt is preferably within the range of 10 to 40% of the inner diameter d1 of each of the pockets Pt. Where the maximum widthwise dimension H of each of the communicating ports Rh is not greater than the lower limit of 10% of the inner diameter d1 of the respective pocket Pt, migration of the grease through the associated communicating port Rh will be difficult to achieve. On the other hand, where the maximum widthwise dimension H of each of the communicating ports Rh is greater than 40% of the inner diameter d1 of the respective pocket Pt, it will become difficult for the pocket Pt to retain the associated ball 4 properly.

Figure 7:
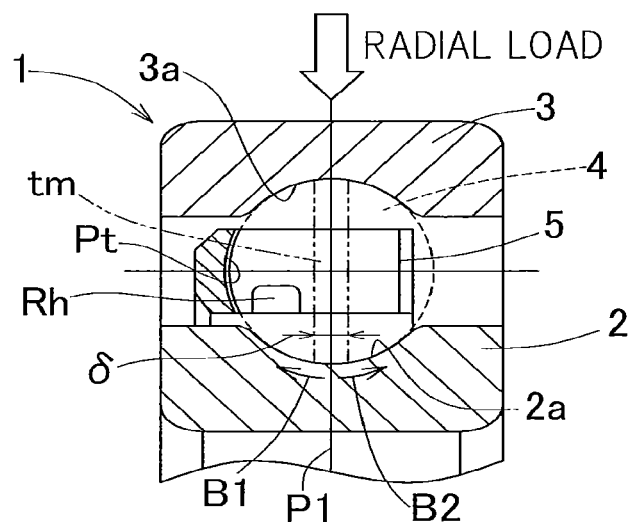
FIG. 7 is a fragmentary sectional view of that portion of the rolling bearing assembly showing portions and others, where balls and raceways contact when only a radial load is applied to the rolling bearing assembly.

FIG. 7 illustrates a sectional view showing portions of the rolling bearing assembly 1, in which one of the balls 4 is held in rolling contact with the raceways 2a and 3a, particularly where only a radial load is applied to the rolling bearing assembly according to this embodiment. As best shown therein, in a condition in which the bearing assembly 1 is loaded only with the radial load, a portion tm (rolling surface tm), where each of the balls 4 is held in rolling contact with any one of the raceway 2a in the inner ring 2 and the raceway 3a in the outer ring 3, is parallel to a radial direction and has a certain length of width δ on both sides from an axial direction center P1. In the case of the bearing assembly 1 having its bearing space filled with the grease such as in the bearing assembly employed in the practice of this embodiment, the grease that is trodden by each of the balls 4 then in rolling motion is urged to move in both directions laterally outwardly from the rolling surface tm with respect to the axial direction as indicated by the arrows B1 and B2, and portion of the grease so urged away from the rolling surface tm is subsequently deposited on the ball 4. Since at this time the curvature of any of the raceways 2a and 3a is greater than the curvature of each of the balls 4, the amount of the grease deposited on the respective ball 4 increases as it goes away from the rolling surface tm. In other words, in view of the fact that the curvature of each of the raceways 2a and 3a is greater than that of each of the balls 4, a radial gap delimited between any one of the raceways 2a and 3a and the respective ball 4 increases as it goes away from the rolling surface tm of either the raceway 2a or the raceway 3a in both directions laterally with respect to the axial direction. Accordingly, the amount of the grease deposited on any ball 4 increases as it goes away from the rolling surface tm of either the raceway 2a or the raceway 3a in both directions laterally with respect to the axial direction.

Of the grease deposited on the ball 4, a portion of the grease on one side of the axial direction away from the rolling surface tm, where the corresponding communicating port Rh exists, is scraped at the communicating port Rh as the respective ball 4 undergoes rotation, that is, relative movement within the associated pocket Pt. In other words, provision of the communicating port Rh on one of the opposite sides of the rolling surface tm with respect to the axial direction (a left side as viewed in FIG. 7) allows an excessive amount of grease, deposited on the respective ball 4, to be scraped off by the relative movement referred to above. Along therewith, the excessive grease is urged to move towards the adjacent grease detainment bay GP (See FIG. 6 showing examples A and B.) through the associated communicating port Rh under the influence of a pressure of the respective ball 4.

Figure 8:
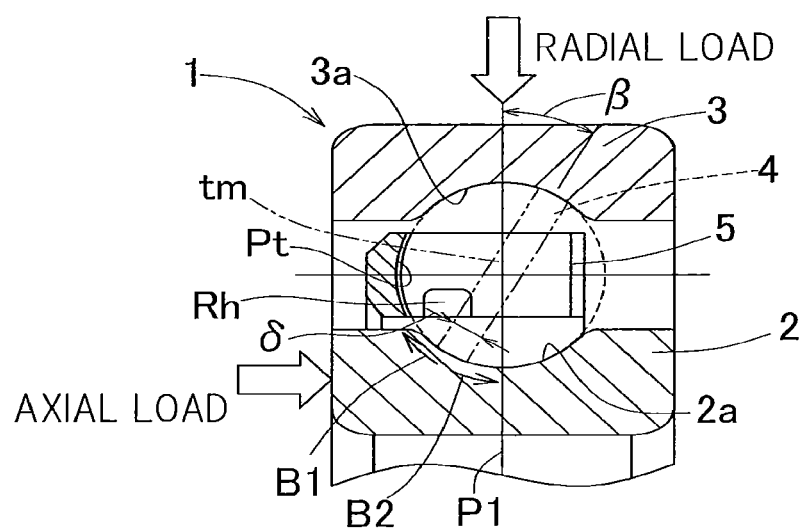
FIG. 8 is a fragmentary sectional view of that portion of the rolling bearing assembly showing portions and others, where balls and raceways contact when a radial load and an axial load are applied to the rolling bearing assembly.

FIG. 8 illustrates a sectional view showing portions of the rolling bearing assembly 1, in which one of the balls 4 is held in rolling contact with the raceways 2a and 3a, particularly where a radial load and an axial load are simultaneously applied to the rolling bearing assembly employed in the practice of this embodiment. As best shown therein, where composite loads comprised of the radial load and the axial load are simultaneously loaded on the bearing assembly 1, the rolling surface tm is tilted at an angle β relative to the radial direction and has a certain length of width δ on both sides of this rolling surface. The grease trodden by the ball 4 then rolling is driven away from the rolling surface tm towards opposite sides with respect to the axial direction shown by the arrows B1 and B2, and a portion of the grease so driven deposits on the respective ball 4.

Of the grease deposited on the ball 4, a portion of the grease driven towards one side with respect to the axial direction (a left side as viewed in FIG. 8) is scraped at the communicating port Rh as the respective ball 4 undergoes rotation, that is, relative movement within the associated pocket Pt. In other words, positioning of the communicating port Rh on one side of the rolling surface tm with respect to the axial direction allows an excessive amount of grease, deposited on the respective ball 4, to be scraped off by the relative movement referred to above. Along therewith, the excessive grease is urged to move towards the adjacent grease detainment bay GP (See FIG. 6 showing examples A and B.) through the associated communicating port Rh under the influence of a pressure of the respective ball 4 regardless of the direction of the axial load.

Figure 9A:
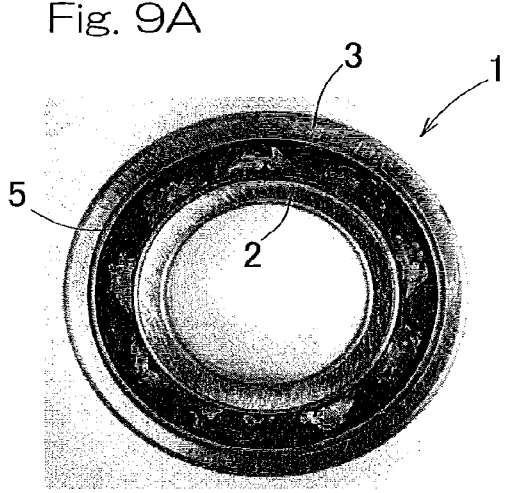
FIG. 9A is a side view of the rolling bearing assembly after the rolling bearing assembly has been operated, as viewed from the counter pocket side of the retainer.
Figure 9B:
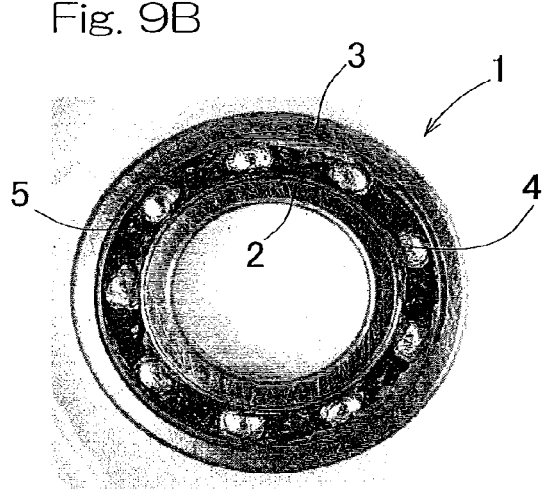
FIG. 9B is a side view of the rolling bearing assembly after the rolling bearing assembly has been operated, as viewed from the pocket side of the retainer.
Figure 10A:
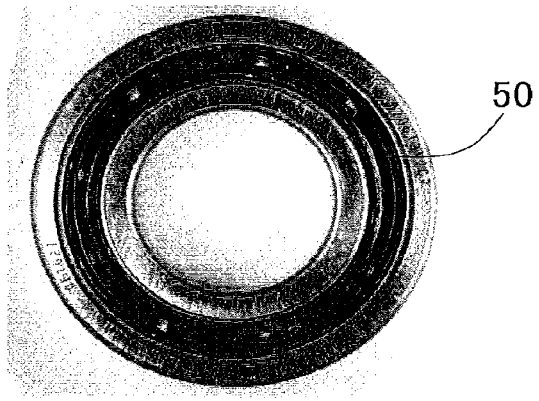
FIG. 10A is a side view of a conventional rolling bearing assembly after the rolling bearing assembly has been operated, as viewed from the counter pocket side of the retainer, which bearing assembly is only for the purpose of comparison.
Figure 10B:
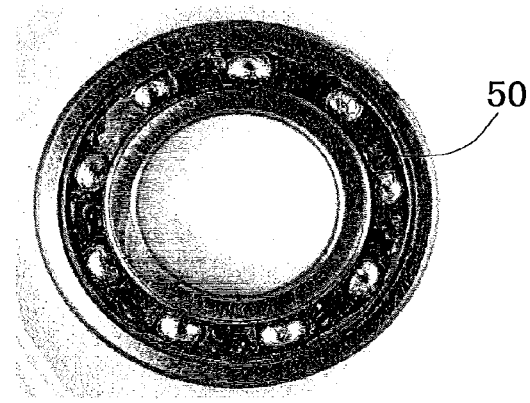
FIG. 10B is a side view of the conventional rolling bearing assembly after the rolling bearing assembly has been operated, as viewed from the pocket side of the retainer, which bearing assembly is only for the purpose of comparison.
Figure 19:
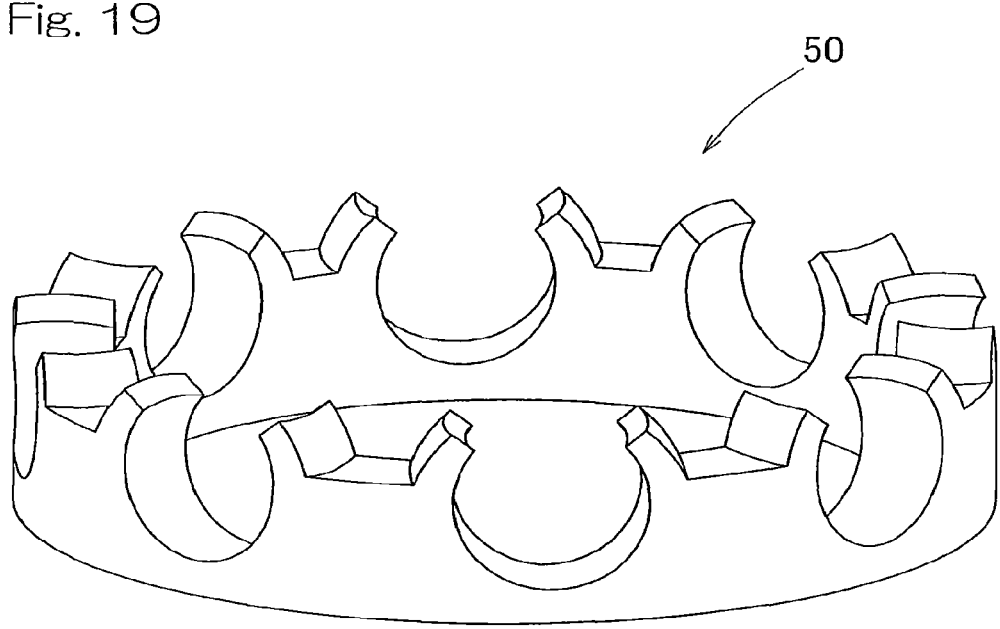
FIG. 19 is a perspective view of a conventional crown shaped retainer.
Figure 20:
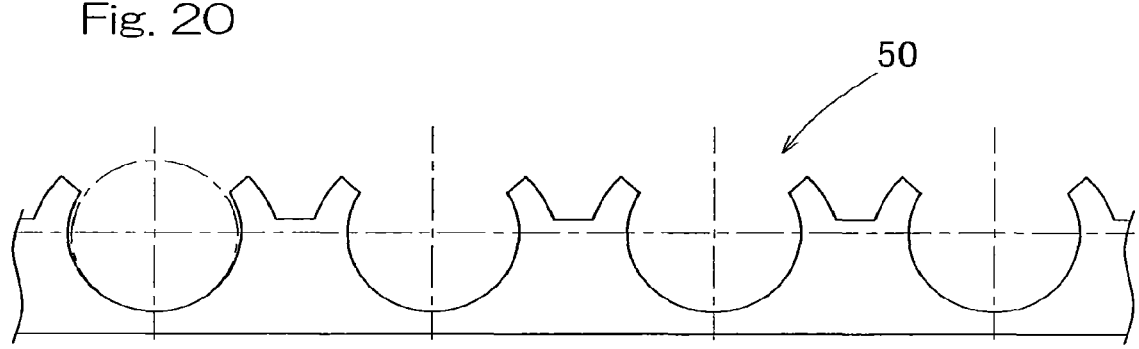
FIG. 20 is a sectional view showing a portion of the conventional crown shaped retainer shown in FIG. 19.

Hereinafter, a comparative test will be discussed. The bearing assembly, having incorporated therein the retainer designed in accordance with this embodiment, and the comparative bearing assembly, having incorporated therein the conventional crown shaped retainer, were compared with each other. FIGS. 9A and 9B and pertain to the bearing assembly utilizing the retainer according to this embodiment now under discussion while FIGS. 10A and 10B pertain to the comparative bearing assembly, utilizing the conventional crown shaped retainer 50, and illustrate photographs of those bearing assemblies after they have been operated under the following running conditions. It is noted that FIG. 19 illustrates a perspective view of the conventional crown shaped retainer 50 and FIG. 20 illustrates a sectional view of a portion of the conventional crown shaped retainer 50. The running conditions referred to above were: Bearing model number of a deep groove ball bearing was 6206, the speed of rotation was $1800 \text{ min}^{-1}$, and the running time was about 30 seconds.

According to the comparative test conducted, the retainer 5 designed according to this embodiment has revealed that regardless of the grease filled position relative to the bearing assembly, the grease entered each of the grease detainment bays GB through the corresponding communicating ports Rh and, as compared with that with the conventional retainer 50, the amount of the grease on the pocket Pt side was small. The grease quickly migrated into the respective grease reservoir depressed portion GB in an extremely brief time to result in a low torque. If the grease is initially filled in the grease reservoir depressed portions GP, the torque at the time of start-up can be reduced.

According to the rolling bearing assembly 1 as hereinbefore described, since the grease reservoir depressed portions GP are provided in the retainer 5 and also with the communicating ports Rh each communicating the neighboring pockets Pt, having the respective balls 4 received therein, with the adjacent grease reservoir depressed portion GP, the grease deposited on each of the balls 4 is, during the operation of the bearing assembly, caused to migrate into the adjacent grease reservoir depressed portion GP through the associated connecting port Rh. In other words, as the respective ball 4 rolls within the corresponding pocket Pt, a portion of the grease deposited on such ball 4 reaches the corresponding communicating port Rh and, during the further rolling of the ball 4 within the corresponding pocket Pt (that is, the relative movement), that portion of the grease is scraped at the adjacent communicating port Rh and is, at the same time, urged by the pressure of the ball 4 to migrate towards the grease reservoir depressed portion GP through such communicating port Rh. Since the grease referred to above is accommodated within the grease reservoir depressed portion GP and rotates together with the retainer 5, the stirring resistance and the shearing resistance, both referred to previously, can be mitigated.

In the lubrication with the grease, a base oil of the grease works in lubrication. The base oil separated from the grease reserved within each of the grease reservoir depressed portions GP is supplied to the corresponding ball 4 through the adjacent communicating port Rh and, therefore, the base oil required for the lubrication can be utilized. As hereinabove discussed, regardless of the application of the bearing assembly and with no need for change of the grease or the sealing device, not only can the rotating torque of the bearing assembly be assuredly reduced, but the base oil separated from the grease reserved within the respective grease reservoir depressed portion GP can also be used in lubrication.

Since each of the communicating ports Rh is in the form of a cutout opening radially inwardly of the retainer ring body 7, the communicating ports Rh can be provided in the retainer without making the retainer complicated in shape. Since each of the communicating ports Rh is employed in the form of a cutout, but not a hole, an effect of scraping the grease with an edge (edge portion) of the respective cutout is promoted and, hence, an affect of scraping it into the adjacent grease reservoir depressed portion GP can be enhanced. In such case, the structure of a mold assembly used to form the retainer 5 by means of the injection molding technique can be simplified. Accordingly, the cost of manufacture of the retainer 5 can be reduced.

Where the retainer 5 is to be manufactured with the utilization of the injection molding technique, which is excellent for its capability of accomplishing a mass production, the use of a polyamide resin such as, for example, nylon as the synthetic resinous material makes it easy to process and assemble and does therefore make it possible to manufacture at a low cost. The use of polyether ether ketone, PEEK for abbreviation, as the synthetic resinous material for the retainer 5 makes it possible to render it to be excellent in high strength, heat resistance, wear resistance and resistance to hydrolysis. On the other hand, the use of polyphenylene sulfide, PPS for abbreviation, as the synthetic resinous material for the retainer 5 makes it possible to provide a retainer 5 excellent in high temperature characteristic and resistance to chemicals and having a high incombustibility and a high dimensional stability.

Considering the low environmental load, which has been currently strongly required in industrial products, resinous materials of plant origin may be used as the material for the retainer. That is, bioplastics of a kind effective to achieve the zero $CO_2$ balance (carbon neutral) may be used and this category includes, for example, polylactic acid or polybutylene succinate, which are synthesized from carbohydrates such as, for example, sugar cane or corn, and polyamides which are synthesized from, for example, castor oil To use any of the synthetic resinous materials and resinous materials of plant origin as a specific material for the retainer 5, reinforcement with the use of glass fibers or carbon fibers is generally required.

Figure 11A:
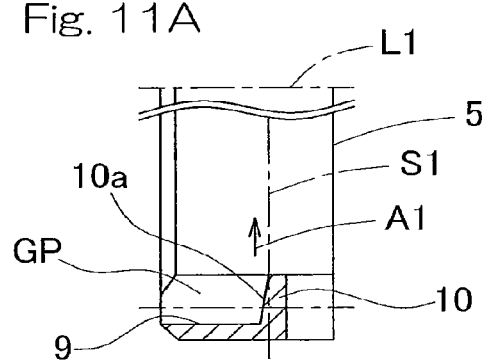
FIG. 11A is a sectional view showing a first example of the sectional shape of one of the grease reservoir depressed portions employed in the retainer for the rolling bearing assembly designed in accordance with a second embodiment of the present invention.
Figure 11B:
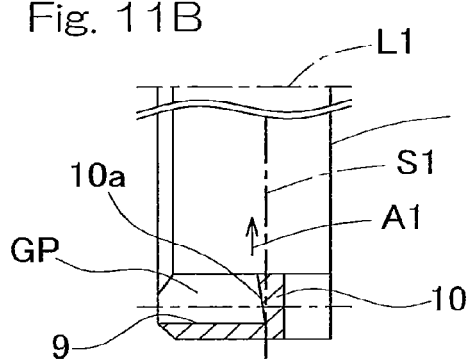
FIG. 11B is a sectional view showing a second example of the sectional shape of one of the grease reservoir depressed portions employed in the retainer for the rolling bearing assembly designed in accordance with the second embodiment of the present invention.

The retainer designed in accordance with a second embodiment of the present invention will now be described in detail with particular reference to FIGS. 11A to 11D. As shown in FIGS. 11A and 11B, a portion of the retainer ring body 7 of the retainer 5, where the corresponding grease reservoir depressed portion GP is defined, may have such a sectional shape, when viewed in a plane containing the axis L1 of the retainer ring body 7, that the corresponding connecting segment 10 in the retainer ring body 7 has an inclined face 10a inclined at an angle relative to a plane S1 orthogonal to the axis L1.

The inclined face 10a employed in the retainer 5 shown in FIG. 11A is of a structure in which the wall thickness of the corresponding connecting segment 10 is made decreasing in a direction radially inwardly thereof as shown by the arrow A. In this case, the retainer rigidity can be increased as compared with the retainer shown in and described with particular reference to FIG. 4 and the strength of the retainer 5 can be secured when it is rotated at a high speed. In addition, during the operation of the bearing assembly, the grease reserved within each of the grease reservoir depressed portions GP can be smoothly discharged from the inclined face 10a into the annular bearing space through the inner wall face 9 by the effect of a centrifugal force developed as a result of rotation. The inclined face 10 employed in the retainer 5 shown in FIG. 11B is of a structure in which the wall thickness of the respective communicating port 10 is made increasing in a direction radially inwardly as shown by the arrow A1. In this case, the grease reserved within the respective grease reservoir depressed portion GP can be detained without being leaked during the operation of the bearing assembly.

Figure 11C:
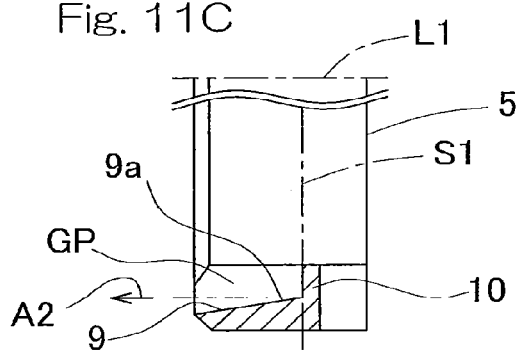
FIG. 11C is a sectional view showing a third example of the sectional shape of one of the grease reservoir depressed portions employed in the retainer for the rolling bearing assembly designed in accordance with the second embodiment of the present invention.
Figure 11D:
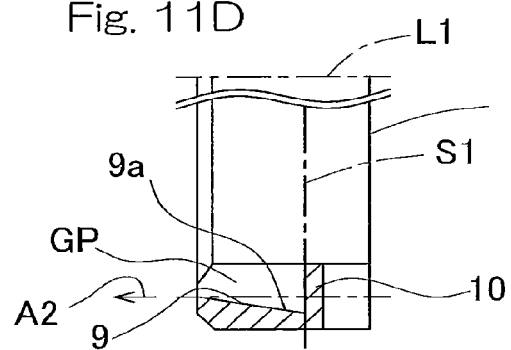
FIG. 11D is a sectional view showing a fourth example of the sectional shape of one of the grease reservoir depressed portions employed in the retainer for the rolling bearing assembly designed in accordance with the second embodiment of the present invention.

The retainer 5 shown in FIG. 11C has an inclined face 9a of a structure in which the wall thickness of the inner wall face 9 is made decreasing in a direction towards the counter pocket side as shown by the arrow A2. In this case, during the operation of the bearing assembly, the grease reserved within the respective grease reservoir depressed portion FP can be smoothly discharged from the inclined face 9a into the annular bearing space by the effect of a centrifugal force developed as a result of rotation. The inclined face 9a employed in the retainer 5 shown in FIG. 11D is of a structure in which the wall thickness of the inner wall face 9 is made increasing in a direction towards the counter pocket side. In this case, during the operation of the bearing assembly, the grease reserved within the respective grease reservoir depressed portion GP can be detained without being leaked.

Figure 12:
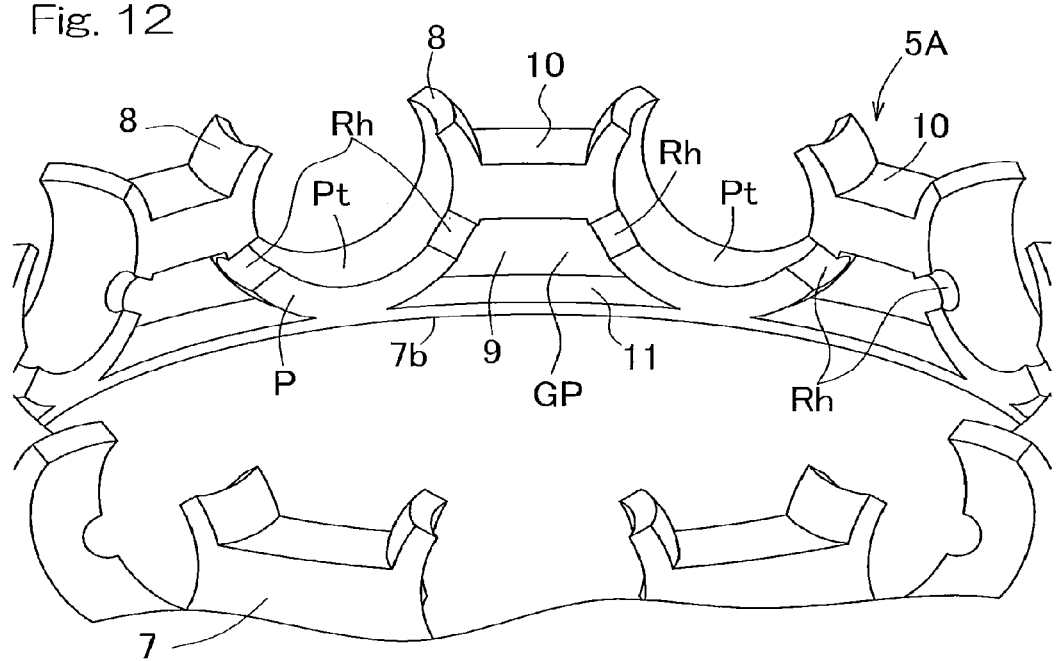
FIG. 12 is a perspective view showing the retainer for the rolling bearing assembly designed in accordance with a third embodiment of the present invention.

With reference to FIG. 12 a third embodiment of the present invention will now be described in detail. The retainer 5A shown in FIG. 12 is of a structure in which the retainer ring body 7 has another side face 7b of the respective grease reservoir depressed portion GP, which is opposite to the counter pocket side, provided with a cover member 11 for covering the other side face of the grease reservoir depressed portion GP. For example, by means of a machine working utilizing, for example, a machining center, the shape having the cover member 11 can be easily formed. According to this retainer 5A, in the case of a high speed operation, an undesirable leakage of the grease reserved within the respective grease reservoir depressed portion GP can be avoided thanks to the use of the cover member 11.

Figure 13:
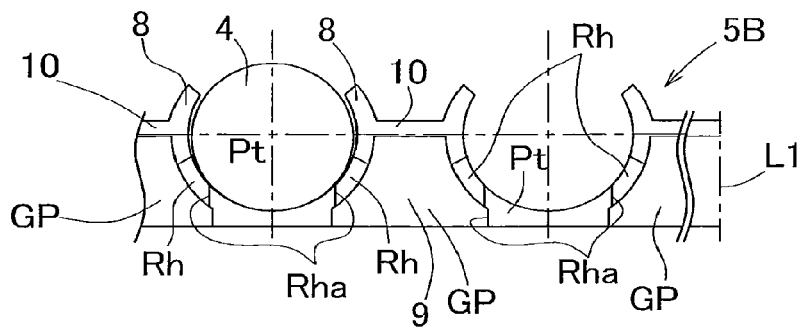
FIG. 13 is a sectional view showing the retainer for the rolling bearing assembly designed in accordance with a fourth embodiment of the present invention.

FIG. 13 illustrates a fourth embodiment of the present invention. The retainer 5B shown therein is of a type manufactured by the utilization of any known injection molding technique, in which each of the communicating ports Rh is so formed as to be flared in a direction from the pocket Pt side towards the adjacent grease reservoir depressed portion GP side. Particularly a counter pocket side portion of each of the communicating ports Rh is so formed as to assume a parallel relation with the axis L1 of the retainer ring body 7. In this case, the retainer 5B can be easily removed from the injection molding mold assembly. Also, a mold on the grease reservoir depressed portion GP side, where a processing is relatively easy to achieve, not on the pocket Pt side where a highly precise processing is required in the mold assembly, can be adopted as a mold for forming the respective communicating ports Rh. Accordingly, the cost required to assemble the mold assembly can be reduced.

Figure 14:
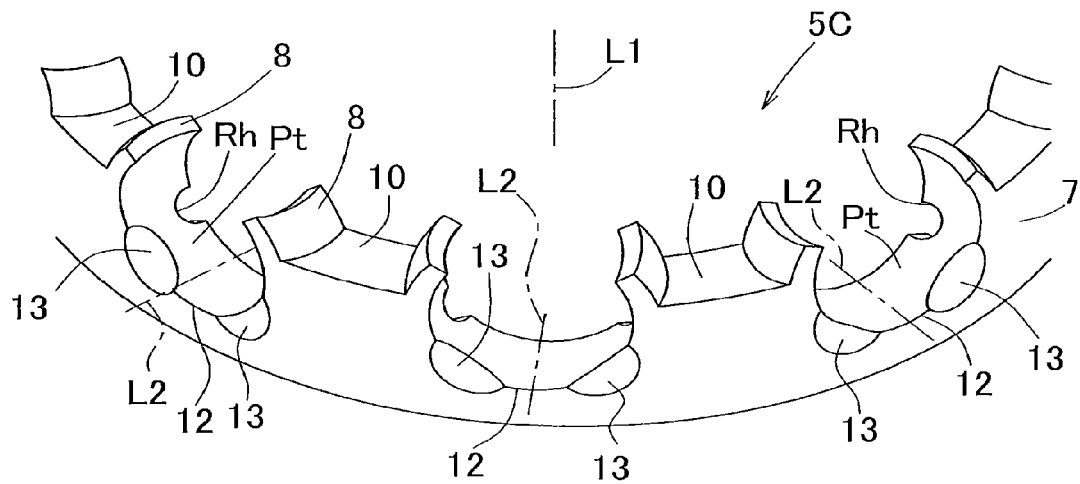
FIG. 14 is a perspective view showing the retainer for the rolling bearing assembly designed in accordance with a fifth embodiment of the present invention.

Reference is now made to FIG. 14, which illustrates a fifth embodiment of the present invention. The retainer 5C shown therein is of a structure in which a first recess portion 13 is provided in a pocket open edge 12 in the inner face of each of the pockets Pt that is situated on a ring body outer diametric side. In the example as shown, the first recess portion 13 is provided at two locations of the pocket open edge 12. Each of those first recess portions 13 extends radially inwardly of the retainer ring body from the pocket open edge 12 to respective positions adjacent the pitch circle depicted by the circular row of the balls. Those first recess portions 13 provided at the two locations of the pocket open edges 12 are disposed on respective sides with respect to a center L2 of the pocket open edge 12 in each of the pockets Pt in the retainer circumferential direction. Each of those first recess portion 13 has an inner face of such a sectional shape that when viewed in section taken in the retainer circumferential direction, represents an arcuate shape of the radius of curvature that is smaller than the radius of curvature of a concaved spherical face defining the inner face of the respective pocket Pt. The term "sectional shape" referred to above is synonymous with the sectional shape of each of the first recess portion 13 when the latter is viewed in a cut plane perpendicular to the axis L1 of the retainer ring body 7. Each of the first recess portion 13 is of a shape gradually getting small, that is, gradually getting shallow and narrow in width, as it goes from the ring body outer diametric side towards the pitch circle depicted by the circular row of the balls.

In the bearing assembly employing the crown shaped retainer 5C of a type having the first recess portion 13 incorporated therein, scraping of the grease at the pocket open edges 12 on the ring body outer diametric side is reduced thanks to the presence of the first recess portion 13. The grease entering the pockets Pt by way of the first recess portion 13 migrates towards an inner ring 2 (FIG. 1) side and forms a layer of a uniform thickness in the vicinity of the pitch circle depicted by the circular row of the balls. For this reason, during the rolling of the balls 4 (FIG. 1) retained by the retainer 5C, an increased amount of the grease within the bearing assembly can be drawn into the grease reservoir depressed portions GP. It is to be noted that the first recess portion 13 may be provided at one or more locations.

Figure 15:
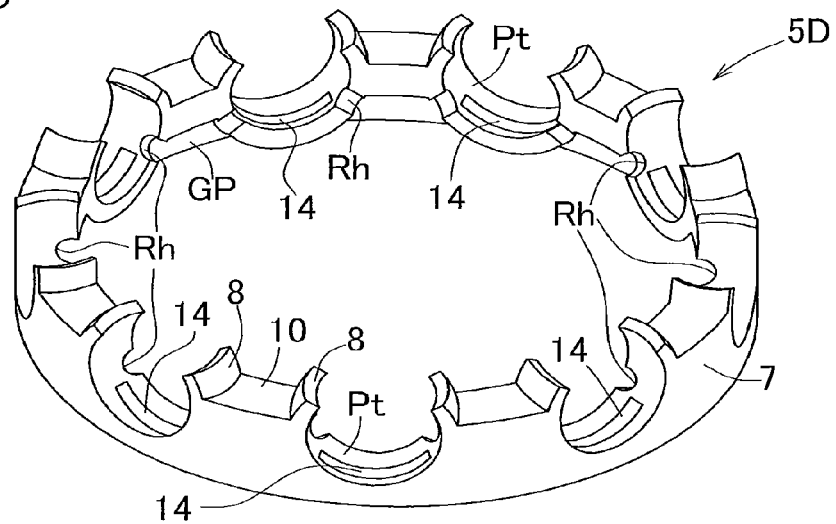
FIG. 15 is a perspective view showing the retainer for the rolling bearing assembly designed in accordance with a sixth embodiment of the present invention.

The following description made with particular reference to FIG. 15 is directed to a sixth embodiment of the present invention. The retainer 5D shown in FIG. 15 is provided with a second recess portion 14 defined in the bottom of the inner face of each of the pockets Pt. The second recess portion 14 is comprised of a single groove formed in a bottom face area of the pocket inner face so as to extend along the curvature of the pitch circle depicted by the circular row of the balls. Each of the grease reservoir depressed portions GP detains the grease containing a thickening agent and a base oil, and the base oil separated from the grease and required in lubrication is migrated into each of the pockets Pt through the corresponding communicating port Rh to thereby participate in the lubrication. Since a portion of the base oil separated from the grease enters the second recess portion 14 referred to above, the viscous shearing resistance developed by the base oil between each of the balls 4 (FIG. 1) and the corresponding pocket Pt can be reduced. Accordingly, it contributes to a further torque reduction.

Figure 16:
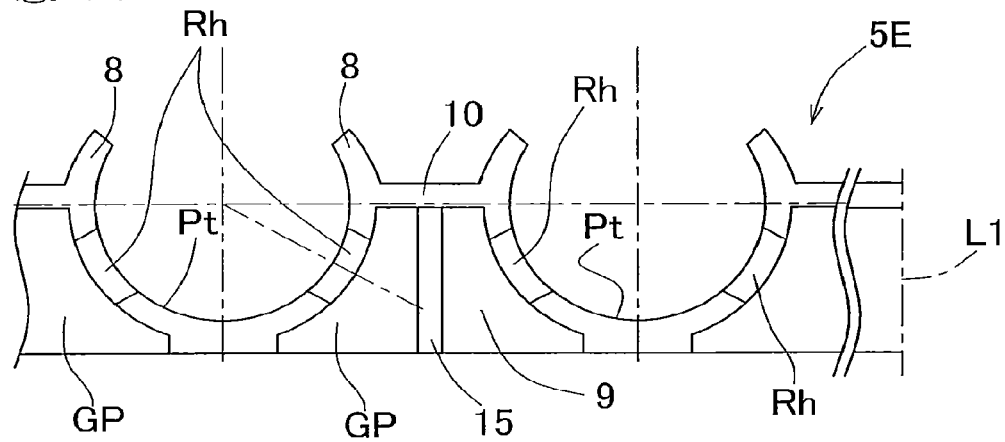
FIG. 16 is a sectional view of a portion of the retainer for the rolling bearing assembly designed in accordance with a seventh embodiment of the present invention, showing the use of a partition wall between the neighboring grease reservoir depressed portions in the retainer.

In a seventh embodiment which will be described subsequently with particular reference to FIG. 16, a partition wall 15 may be provided within each of the grease reservoir depressed portion GP as shown in the retainer 5E. The partition wall 15 employed in accordance with this seventh embodiment is of a kind dividing the grease reservoir depressed portion GP into two compartments and is provided in parallel relation with the axis L1. The provision of the partition walls 15 is effective to regulate the migration of the grease within the respective grease reservoir depressed portions GP to facilitate the deposition of such grease on the inner wall faces 9 of the respective grease reservoir depressed portions GP. Accordingly, retention of the grease within each of the grease reservoir depressed portions GP can be facilitated. It is to be noted that the partition wall 16 may be employed in the form not completely dividing the respective grease reservoir depressed portion GP or in the form not extending parallel to the axis L1.

With the grease initially filled within the grease reservoir depressed portions GP, the amount of the grease on the side of each of the pockets Pt may be small. In this case, the effect of that portion of the grease being scraped by the corresponding communicating port Rh may be lowered as compared with that in any one of the various embodiments hereinabove described, but the torque reduction at the time of start-up can be expected because of the small quantity of the grease on the side of the pockets Pt. Also, the base oil separated from the grease filled within the grease reservoir depressed portions GP is supplied to the balls 4 through the communicating ports Rh and, therefore, the base oil required for the lubrication can be utilized.

As the rolling bearing assembly, an angular contact ball bearing may be employed. In the case of the angular contact ball bearing having a low loaded load, if the number of the balls employed in the bearing assembly in its entirety is reduced and the rotating torque is reduced and, at the same time, the retainer designed in accordance with any one of the various embodiments of the present invention described hereinabove is employed, a further torque reduction can be achieved. Although in any one of the various embodiments hereinabove described, all of the sites located between the neighboring pockets in the retainer ring body are provided with the grease reservoir depressed portion, the present invention is not necessarily limited thereto. It suffices if at least one grease reservoir depressed portion is provided in between arbitrarily chosen pockets.

Figure 17:
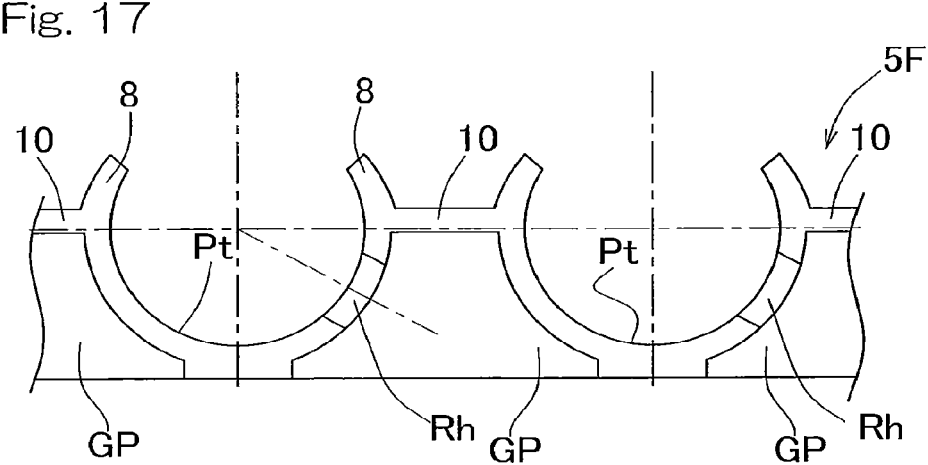
FIG. 17 is a sectional view showing a portion of the retainer designed in accordance with an eighth embodiment of the present invention.
Figure 18:
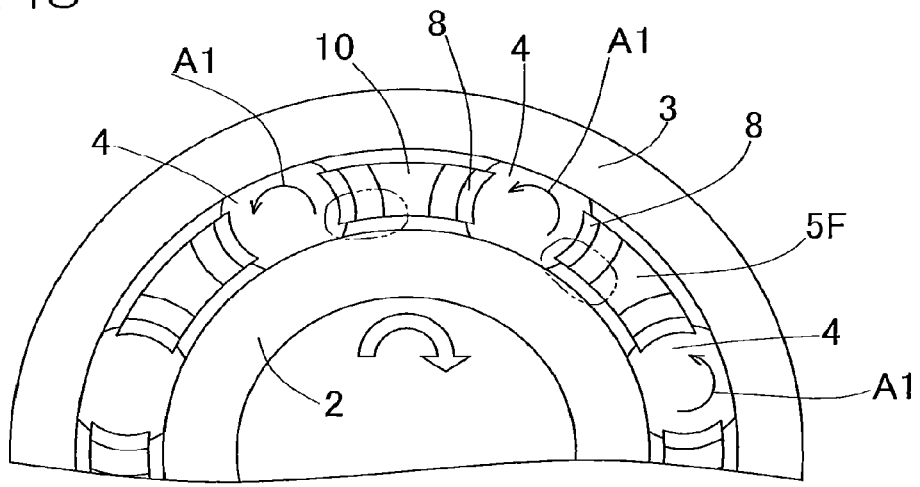
FIG. 18 is a diagram used to explain a function and an effect of the bearing assembly having the retainer incorporated therein.

FIG. 17 pertains to an eighth embodiment of the present invention to which reference will now be made. As shown in FIG. 17, each of the communicating ports employed in the retainer 5F designed according to the eighth embodiment is used to communicate one of the grease reservoir depressed portion GP with one of the pockets Pt on one side of the circumferential direction relative to the corresponding grease reservoir depressed portion GP (i.e., a right side of each of the pockets as viewed in FIG. 17). FIG. 18 illustrates the bearing assembly, utilizing the crown shaped retainer 5F provided with the communicating port Rh only in the pocket Pt on one side of the circumferential direction shown in FIG. 17, which assembly is viewed from the pocket open side.

During the operation of the bearing assembly, each of the communicating ports Rh employed in the retainer 5F is operable to scrape the excessive grease off from the ball from a bearing inner diameter side within the annular bearing space. For this reason, in the case of the application in which the direction of rotation of either one of the inner and outer rings 2 and 3 is fixed, if the communicating port Rh is provided which communicate between each of the grease reservoir depressed portions GP and the adjacent pocket Pt on such one side of the circumferential direction, during the operation of the bearing assembly, such a functional effect occurs in that the grease deposited on the balls as a result of the relative movement of the balls 4 in one direction relative to the retainer 5F is smoothly migrated into the corresponding grease reservoir depressed portion GP through the associated communicating port Rh. Accordingly, the torque reduction can be achieved. As shown in FIG. 18, when the inner ring 2 rotates in a clockwise direction as viewed therein, such a functional effect occurs in that the grease deposited on the balls 4 by the relative movement of the balls 4 in one direction, shown by the arrow A1, relative to the retainer 5F is migrated smoothly into the grease reservoir depressed portions GP through the associated communicating ports Rh.

The grease may be filled within the grease reservoir depressed portions GP during the assemblage of the bearing assembly. By way of example, if without altering the amount of the grease to be filled within the annular bearing space, the grease is filled within the grease reservoir depressed portions GP during the assemblage of the bearing assembly, out of the entire grease filled within the annular bearing space only the grease present on the raceways participates in the lubrication at the time of start-up. Since the grease reserved within the grease reservoir depressed portions GP rotates together with the retainer 5, it is possible to reduce the stirring resistance, with which the balls 4 and the retainer 5 agitate the grease, and the shearing resistance with which the grease is sheared between the retainer 5 and the sealing member or the like. Accordingly, the torque at the time of start-up can be reduced. Thereafter, a portion of the base oil separates from the grease filled in the grease reservoir depressed portions GP and is supplied to the balls 4 within the pockets Pt through the communicating port RH for the lubrication thereof. In this way, not only is a portion of the base oil required for the lubrication utilized, the thickening agent used in the grease is left within the grease reservoir depressed portions GP, and, therefore, neither the stirring resistance nor the shearing resistance will increase during the operation of the bearing assembly.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: Rolling bearing
2: Inner ring
3: Outer ring
4: Ball
5 to 5F: Retainer
6: Sealing member 7: Retainer ring body
8: Pawl
9: Inner wall face
10: Connecting segment
11: Cover member
12: Pocket open edge
13: First recess portion
14: Second recess portion
15: Partition wall
GP: Grease reservoir depressed portion
Pt: Pocket
Rh: Communicating port

What is claimed is:

1. A rolling bearing assembly which comprises:
a plurality of balls interposed between inner and outer rings; and
a retainer for retaining the balls,
wherein the retainer is of a crown shaped configuration including a retainer ring body having one side face formed with a plurality of pockets, each having a portion with an opening, defined at respective locations in a circumferential direction for accommodating therein the balls, a grease reservoir depressed portion provided between the pockets neighboring with each other in the circumferential direction of the retainer ring body for reserving a grease, and a communicating port in the form of a cutout open radially of the retainer ring body provided to communicate the grease reservoir depressed portion and the pocket for allowing the grease deposited on the balls to migrate into the grease reservoir depressed portion as a result of relative movement between the balls and the retainer;
wherein the grease reservoir depressed portion, when viewed in a plane containing an axis of the retainer ring body and passing a middle point between the neighboring pockets, has such a shape as to be defined by an inner wall face of the retainer ring body and a connecting segment bridging between the neighboring pockets; and
wherein the grease reservoir depressed portion has one or both of an inclined face of the inner wall face inclined relative to the axis and an inclined face of the connecting segment inclined relative to a plane that lies perpendicular to the axis.

2. The rolling bearing assembly as claimed in claim 1, wherein the angle of a center portion of the communicating port relative to the plane perpendicular to an axis of the retainer ring body and passing through a center of the pocket is within the range of 20 to 50 degrees.

3. The rolling bearing assembly as claimed in claim 1, wherein the maximum widthwise dimension of the communicating port as measured along a circumferential direction of the pocket is chosen to be within the range of 10 to 40% of the inner diameter of the pocket.

4. The rolling bearing assembly as claimed in claim 1, further comprising a partition wall provided within the grease reservoir depressed portion.

5. The rolling bearing assembly as claimed in claim 1, wherein the retainer ring body has an other side face, opposite to the pocket side, provided with a cover member for covering the other side face of the grease reservoir depressed portion.

6. The rolling bearing assembly as claimed in claim 1, further comprising a first recess portion provided in a pocket open edge in an inner face of the pocket on an outer diametric side of the ring body.

7. The rolling bearing assembly as claimed in claim 1, further comprising a second recess portion provided at a bottom of an inner face of the pocket.

8. The rolling bearing assembly as claimed in claim 1, wherein the retainer is formed by means of an injection molding technique and the communicating port is so shaped as to extend parallel to an axis of the retainer ring body or flared outwardly from the pocket side towards the grease reservoir depressed portion side.

9. The rolling bearing assembly as claimed in claim 1, wherein the retainer contains a synthetic resinous material or a resinous material of plant origin.

10. The rolling bearing assembly as claimed in claim 1, wherein the grease is initially filled in the grease reservoir depressed portion.

11. The rolling bearing assembly as claimed in claim 1, wherein the rolling bearing assembly is a deep groove ball bearing or an angular contact ball bearing.

12. The rolling bearing assembly as claimed in claim 11, wherein in the case of the rolling bearing assembly being a deep groove ball bearing, a sealing member for sealing a bearing space delimited between the inner and outer rings is further provided in the outer ring.

13. The rolling bearing assembly as claimed in claim 1, wherein the communicating port communicates the grease reservoir depressed portion and the pocket on one side of a circumferential direction relative to the grease reservoir depressed portion.

14. A crown shaped retainer which comprises:
a retainer ring body having one side face formed with a plurality of pockets, each having a portion with an opening, defined at respective locations in a circumferential direction for accommodating therein the balls;
a grease reservoir depressed portion provided between the pockets neighboring with each other in the circumferential direction of the retainer ring body for reserving a grease; and
a communicating port in the form of a cutout open radially of the retainer ring body provided to communicate the grease reservoir depressed portion and the pocket for allowing the grease deposited on the balls to migrate into the grease reservoir depressed portion as a result of relative movement between the balls and the retainer,
wherein the grease reservoir depressed portion, when viewed in a plane containing an axis of the retainer ring body and passing a middle point between the neighboring pockets, has such a shape as to be defined by an inner wall face of the retainer ring body and a connecting segment bridging between the neighboring pockets, and
wherein the grease reservoir depressed portion has one or both of an inclined face of the inner wall face inclined relative to the axis and an inclined face of the connecting segment inclined relative to a plane that lies perpendicular to the axis.

* * * * *